(12) United States Patent
Bilski et al.

(10) Patent No.: US 10,315,857 B2
(45) Date of Patent: Jun. 11, 2019

(54) CLEANING DEVICE FOR PNEUMATIC CONVEYANCE SYSTEM

(71) Applicant: Ecolab USA Inc., Saint Paul, MN (US)

(72) Inventors: Matthew Albert Bilski, New Brighton, MN (US); Chad Aaron Thompson, Farmington, MN (US); Jill Kristen Hodowanic, Hudson, WI (US); Pablo Segovia, Golden Valley, MN (US); Brian Joseph Doffing, Arden Hills, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/491,791

(22) Filed: Apr. 19, 2017

(65) Prior Publication Data

US 2017/0297827 A1    Oct. 19, 2017

Related U.S. Application Data

(60) Provisional application No. 62/324,766, filed on Apr. 19, 2016.

(51) Int. Cl.
*B65G 53/52* (2006.01)
*B65G 45/10* (2006.01)
*B65G 53/34* (2006.01)

(52) U.S. Cl.
CPC ............. *B65G 45/10* (2013.01); *B65G 53/34* (2013.01)

(58) Field of Classification Search
CPC ..... B08B 9/0322; B08B 9/055; B08B 9/0557; B65G 53/521; B65G 53/523; B65G 53/526

USPC ................... 406/46, 47, 49, 87, 88; 414/676
See application file for complete search history.

(56) References Cited

U.S. PATENT DOCUMENTS

| | | | | |
|---|---|---|---|---|
| 5,096,262 A | * | 3/1992 | Foullois | B08B 9/051 |
| | | | | 15/104.069 |
| 5,305,488 A | * | 4/1994 | Lyle | B08B 9/0557 |
| | | | | 15/104.061 |
| 5,625,917 A | * | 5/1997 | Hawkins | B08B 9/0553 |
| | | | | 15/104.061 |
| 6,176,938 B1 | * | 1/2001 | Palmer | F16L 55/1283 |
| | | | | 134/22.11 |

(Continued)

FOREIGN PATENT DOCUMENTS

| | | |
|---|---|---|
| DE | 10339353 A1 | 4/2005 |
| DE | 102008046229 A1 | 3/2010 |

(Continued)

OTHER PUBLICATIONS

International Patent Application No. PCT/US2017/028412, International Search Report and Written Opinion dated Jul. 23, 2017, 12 pages.

*Primary Examiner* — Joseph A Dillon, Jr.
(74) *Attorney, Agent, or Firm* — Fredrikson & Byron, P.A.

(57) ABSTRACT

A device for maintaining a pneumatic conveyance line can include a body having one or more wings. In some examples, the body is configured to be positioned between opposing rails of a pneumatic conveyance track with the one or more wings positioned on a respective opposing rail of the track. The wings can carry one or more agents for at least one of cleaning and lubricating the track. As the device is pushed along the track, the device can clean and/or lubricate the track.

20 Claims, 7 Drawing Sheets

(56) References Cited

U.S. PATENT DOCUMENTS

| | | | | |
|---|---|---|---|---|
| 6,500,271 B1 * | 12/2002 | Moore | ............ | B08B 9/055 |
| | | | | 134/8 |
| 6,527,869 B1 * | 3/2003 | Bourg | ............ | B08B 9/0551 |
| | | | | 134/1 |
| 7,743,450 B2 * | 6/2010 | Rouillard | ............ | B08B 9/055 |
| | | | | 15/104.03 |
| 8,973,738 B2 | 3/2015 | Hilarides et al. | | |
| 2003/0056309 A1 * | 3/2003 | Savard | ............ | B08B 9/0551 |
| | | | | 15/104.061 |
| 2004/0074030 A1 * | 4/2004 | Nehrbass | ............ | B08B 9/055 |
| | | | | 15/104.062 |
| 2004/0115012 A1 * | 6/2004 | Seidl | ............ | B65G 51/035 |
| | | | | 406/86 |
| 2007/0251038 A1 | 11/2007 | Rouillard et al. | | |
| 2012/0020747 A1 | 1/2012 | Schneider et al. | | |
| 2016/0363249 A1 * | 12/2016 | Disher | ............ | F16L 55/46 |

FOREIGN PATENT DOCUMENTS

| | | |
|---|---|---|
| JP | 2005089147 | 4/2005 |
| JP | 2006297291 A | 11/2006 |
| JP | 2008184632 A | 8/2008 |
| JP | 2008272703 A | 11/2008 |
| SU | 1207030 A1 | 3/1992 |
| WO | 2005087395 A1 | 9/2005 |
| WO | 2009080885 A1 | 7/2009 |
| WO | 2009080886 A1 | 7/2009 |
| WO | 2009114845 A2 | 9/2009 |

\* cited by examiner

CLEANING DEVICE FOR PNEUMATIC CONVEYANCE SYSTEM

CROSS-REFERENCE

This application claims priority to U.S. Provisional Patent Application No. 62/324,766, filed Apr. 19, 2016, the entire contents of which are incorporated herein by reference.

TECHNICAL FIELD

This disclosure relates to pneumatic conveyance systems and, more particularly, to cleaning devices for pneumatic conveyance systems.

BACKGROUND

Air conveyors are commonly used for the rapid transport of large numbers of articles, such as plastic articles, between workstations. A typical air conveyor for conveying plastic bottles includes a pair of flanges or guides, positioned apart from one another to form an elongated slot. The flanges are commonly covered by a top wall and laterally spaced side walls to form a channel having an inverted U-shaped configuration. A series of louvers positioned on top or the sides of the channel direct pressurized air from a plenum against the articles being conveyed. The force of the pressured air propels the objects along the conveyance track defined by the flanges.

For handling purposes, plastic preforms, bottles and containers are often formed with annular rims positioned below their neck finish, which may be a threaded collar designed to receive a screw cap. When transported by an air conveyor, the neck finish extends upwardly through the slot formed between the flanges with their annular rims overlying the spaced flanges. In this manner, the bottles or containers are suspended from the flanges by their annular rims.

In practice, an air conveyor may need periodic cleaning and maintenance to ensure smooth, uninterrupted passage of objects along the track. For example, the track of the air conveyor may need to be cleaned to remove any dust or debris that has accumulated on the track. As another example, the track may be lubricated to reduce friction between the track and the objects being conveyed. In either case, cleaning and maintenance is often performed in practice by shutting the air conveyor line down and having operators manually service the line. While this provides a thorough approach to servicing the line, the cost of taking the line out of service and the amount of labor required can be significant.

SUMMARY

In general, this disclosure is directed to a device for cleaning a pneumatic conveyance line. The device may be inserted between the flanges, or rails, of the line and conveyed using the pneumatic motive power that also propels objects along the line during normal operation. In some examples, the device includes a body that has a pair of opposed wings extending outwardly from the body. The wings may be sized to contact the top surfaces of the opposed rails (e.g., along which the rim on which a container may travel). The device may also have a rail, or leg, projecting downwardly from the body. The rail of the cleaning device can be positioned to extend down through the elongated slot formed by the flanges of the pneumatic conveyance line.

In some configurations, the wings and rail of the cleaning device form, in combination, a pair of opposed channels that are configured to receive the opposed flanges of the pneumatic conveyance line. As the cleaning device is propelled through the pneumatic conveyance system, the cleaning device can physically contact a top surface and, in some configurations, a side wall of each of the rails. Depending on the size and shape of the device, the cleaning device may contact other surfaces of the pneumatic conveyance system in addition to or in lieu of the rails (e.g., the side walls and/or top surface of the housing defining the pneumatic ductwork forming the conveyance line). In either case, the cleaning device may provide a mechanical cleaning action that facilitates quick and efficient servicing of the pneumatic conveyance line.

To further facilitate servicing of the pneumatic conveyance line, the cleaning device can carry a chemical agent selected to improve the operating performance of the line. Typical chemical agents may include cleaning agents (e.g., degreasing agent, surfactant, sanitizing agent) and/or lubricating agents (e.g., silicone, oil, graphite). In some examples, the chemical agent is impregnated into the body of the cleaning device. For example, device may be formed from a polymer admixed with the agent. As another example, the device may have a microporous surface impregnated with the agent. In other configurations, the device can carry the chemical agent by attaching a carrier substrate impregnated with the agent. A cloth substrate, brush, sponge, scrub pad, or other substrate containing the chemical and/or lubricating agent may be attached to the cleaning device, e.g., such that some or all of the surfaces of the cleaning device that would otherwise contact surfaces of the pneumatic conveyance system are covered with the cloth. The carrier substrate may be permanently attached to the device (e.g., such that it is not removable without destroying the carrier substrate) or may be removable and replaceable with a fresh carrier substrate.

In use, the cleaning device can be inserted into the pneumatic conveyance system and propelled through the system using the pneumatic force otherwise used to convey objects typically processed on the line. In some applications, one or more of the objects typically processed on the line are positioned behind the cleaning device and used to help propel the cleaning device through the line. For example, the objects typically processed on the line may have a larger surface area exposed to the pneumatic force generated by the line than the cleaning device. As a result, the objects positioned behind the cleaning device may act as a force transfer device, transferring force from air injected into the line to the cleaning device.

In some applications, the pneumatic conveyance line is evacuated of objects being processed and the cleaning device is passed through the line, e.g., with one or more of the objects inserted behind the cleaning device to help propel it through the line. In other examples, the cleaning device is inserted into the pneumatic conveyance line during active processing and conveyance of objects. For example, the cleaning device may be inserted into the conveyance line between objects being processed such that the cleaning device is bounded between the objects on both a leading end and a trailing end. This can allow the line to be serviced without any disruption in normal operation.

The cleaning device can be passed through the pneumatic conveyance line (e.g., an entire length of the line) one or more times to service the line. Depending on the design of the device, the device (or a component thereof) may be disposed after use. For instance, in some applications, a cloth carrying a cleaning agent may be attached to the cleaning device and the device passed through the pneumatic conveyance line. After passing out of the discharge end of the line, the cloth may be removed and a clean cloth (e.g., carrying the same or different cleaning agent, or no cleaning agent in the case of a dry cloth) attached to the device. The cleaning device can then be reinserted into the pneumatic conveyance line and the process repeated until the line is determined to be acceptably cleaned and/or lubricated.

In one example, a device for cleaning a pneumatic conveyance line is described. The device has a body having a length extending from a leading end to a trailing end and a width extending perpendicularly to the length. The width of the body defines a pair of wings projecting in opposed directions from a centerline of the body. The body is configured to be positioned between opposed rails of a pneumatic conveyance track with each of the pair of wings positioned on a respective one of the opposed rails. The example specifies that the pair of wings carry an agent for at least one of cleaning and lubricating the opposed rails of the pneumatic conveyance track.

In another example, a method of cleaning a pneumatic conveyance line is described. The method includes positioning a body of a cleaning device between opposed rails of a pneumatic conveyance track. The body has a length extending from a leading end to a trailing end and a width extending perpendicularly to the length. The width of the body defines a pair of wings projecting in opposed directions from a centerline of the body that carry an agent for at least one of cleaning and lubricating. The example specifies that positioning the body of the cleaning device includes positioning each of the pair of wings on a respective one of the opposed rails. The method further involves positioning at least one pushing object on the pneumatic conveyance track trailing the trailing end of the cleaning device and pneumatically conveying the at least one pushing object along the pneumatic conveyance track, thereby causing the at least one pushing object to push the cleaning device along the opposed rails and clean and/or lubricate the pneumatic conveyance track.

In another example, a method is described that includes positioning means for maintaining a pneumatic conveyance track between opposed rails of the pneumatic conveyance track. The means for maintaining the pneumatic conveyance track carries means for at least one of cleaning and lubricating. The method further involves positioning means for pushing on the pneumatic conveyance track trailing the means for maintaining. The method also involves conveying the means for pushing and thereby conveying the means for maintaining along the pneumatic conveyance track.

The details of one or more examples are set forth in the accompanying drawings and the description below. Other features, objects, and advantages will be apparent from the description and drawings, and from the claims.

DETAILED DESCRIPTION

This disclosure is generally directed to devices and techniques for servicing pneumatic conveyance systems. In some examples, a device according to the disclosure is configured to carry one or more chemical agents that are distributed through the pneumatic conveyance system by inserting the device into the system and then conveying the device through the system. For example, the device may be configured as a substantially rigid body that has one or more chemical agents impregnated therein or are contained in a flexible carrier substrate attached thereto. The device may be positioned between opposed rails of the pneumatic conveyance line and pushed along the rails using the pneumatic force supplied by the system during conveyance of objects typically processed on the system.

In one example, the device is physically attached to an object being conveyed through the system, e.g., by positioning a portion of the device over a neck of the object. In another example, the device is positioned in contact with one or more objects being conveyed through the system, e.g., without being physically attached to the objects. In still other examples, the device is conveyed through the system without contacting objects typically transported on the rails through the pneumatic system. The device can have a variety of configurations and features, as described herein.

Figure 1:
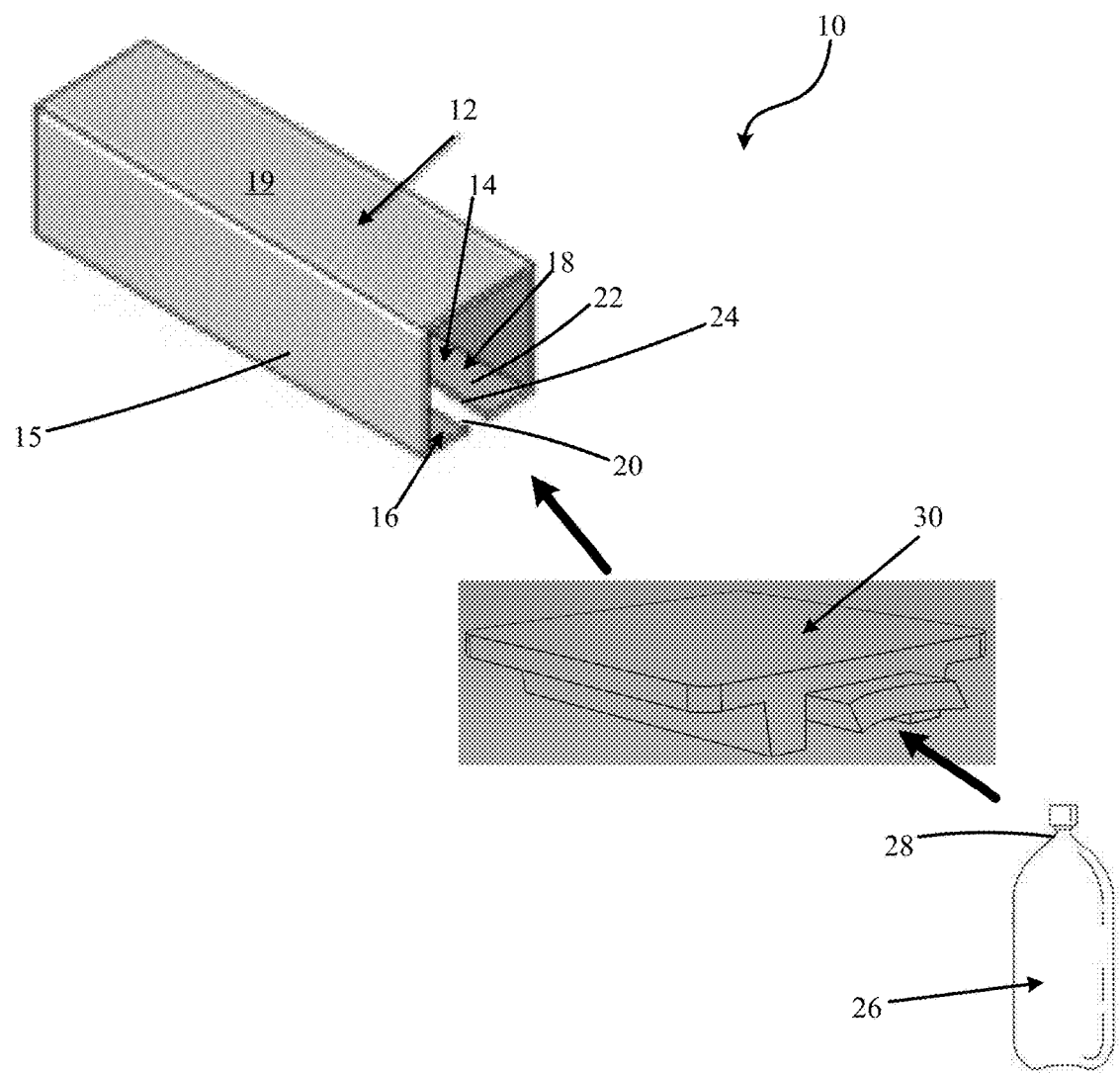
FIG. 1 is a schematic diagram illustrating an example system for maintaining a pneumatic conveyance system.

FIG. 1 is a schematic diagram of an example system 10, which includes a pneumatic conveyance line 12 (only a segment of which is shown for purposes of illustration), an object 26 to be conveyed through the pneumatic conveyance line, and a device for cleaning the pneumatic conveyance line 30. The object 26 to be conveyed through the line and the cleaning device 30 are illustrated as positioned outside of conveyance line 12 but insertable into the line. In operation, a plurality of objects 26, either of the same style or different styles (e.g., size, shape, weight) are inserted into conveyance line 12 and transported from one location in a facility to another location in a facility using the line. As will be described, device 30 can be inserted into conveyance line 12 periodically to clean or otherwise service the line.

In general, pneumatic conveyance systems employ pressurized air (or other gaseous fluid) as a motive force to transport objects from one location to another. These objects are generally transported by the pneumatic conveyance system along a line which includes one or more apertures for delivering the pressurized air acting to move the objects along the line. In some cases the pressurized air acts directly on an object. In other cases the pressurized air acts to move a conveyor element attached to the object such that the conveyor element, and thus the object to which it is attached, is moved along the line. Pneumatic conveyance systems are used in a wide variety of industries to transport various types of objects. One particular example is the beverage industry, where the object transported along the pneumatic conveyance line may be a bottle, beverage container, bottle preform, or other container structure. Another example is the dairy industry where a dairy container may be transported along the pneumatic conveyance line.

The embodiment of the system 10 shown in FIG. 1 includes pneumatic conveyance line 12 along which one or more objects can be transported within a pneumatic conveyance system. To transport the one or more objects, the line 12 may include one or more apertures (not shown) for delivering pressurized air within the line 12. In addition, the line 12 can include a pneumatic conveyance track 14 having opposing rails 16, 18 defining a slot 20 extending along a surface of the line 12. Each of the rails 16, 18 may include an upwardly facing surface 22 and a sidewall surface 24. As shown, conveyance line 12 may form a duct bounded, collectively, by the surfaces forming track 14, sidewalls 15, and a top surface 19 for containing pressurized air within the line.

The one or more objects (and in some cases a conveyor element attached thereto) conveyed along the line 12 can be held within the slot 20 and moved along the track 14. In one example, a portion of the object can extend through the slot 20 into the track 14 so as to interface with the upwardly facing surfaces 22 of the opposing rails 16, 18. As a result, the object can be moved along the upwardly facing surfaces 22 of the opposing rails 16, 18 via pressurized air. For instance, in the illustrated example, the objects to be conveyed along the line 12 are shown as being one or more bottles or bottle pre-forms 26. The bottles 26 may be held within the slot 20 at an upper region (e.g., bottle neck) 28 and urged along the track 14 by pressurized air. Thus, the bottles 26 may slide along the upwardly facing surfaces 22 as well as the sidewall surfaces 24 of the opposing rails 16, 18 with the underside of the bottle neck in contact with the upwardly facing surfaces 22 of the rails. In cases where a conveyor element is attached to the bottles 26, the conveyor elements may similarly slide along the upwardly facing surfaces 22 and the sidewall surfaces 24. Other objects can be conveyed using conveyance system 12, and the disclosure is not limited to the example of a bottle.

To keep the pneumatic conveyance system clean and/or operating properly, it may be useful to maintain the pneumatic conveyance line 12. In particular, the track 14 may need to be periodically cleaned/lubricated. The track 14 may also accumulate dust, microorganisms, or other contaminates (e.g., raw materials being processed, volatiles, beverage syrup) that can be desirable to remove from the track 14. Such maintenance can act to keep the pneumatic conveyance system from jamming along the line 12 as well as reduce or eliminate the risk that objects (e.g., bottles 26) being conveyed along the line 12 will be contaminated.

To maintain the line 12, the system 10 can include a maintenance device 30 according to the present disclosure. The device 30 can be positioned in the line 12 and conveyed along the track 14. The device 30 can carry one or more agents useful for maintaining the line 12, and deliver the one or more agents to the line 12 as the device 30 is conveyed along the track 14. In one example, the device 30 can deliver the one or more agents along a length of the track 14, such as along a length of each of the opposing rails 16, 18. In this way, the pneumatic conveyance system can be maintained in an efficient manner that may reduce or eliminate the need for manual cleaning and/or lubrication.

Figure 2:
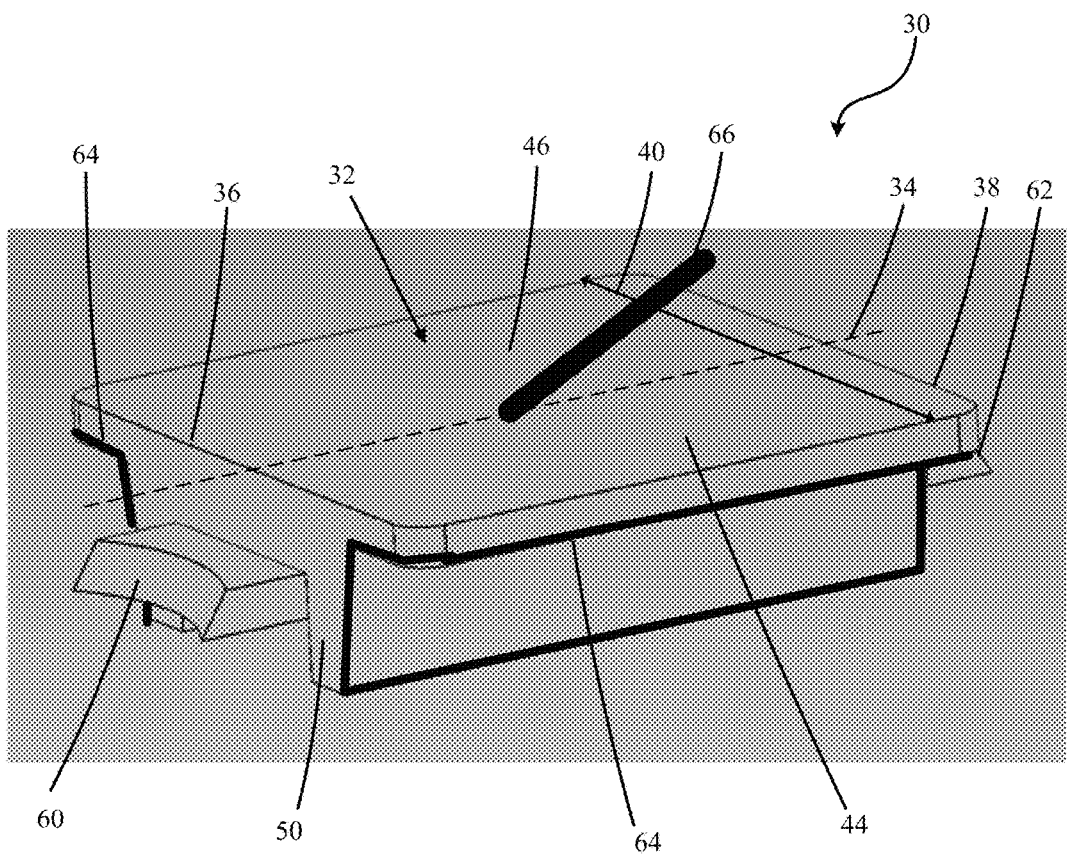
FIG. 2 is a perspective view illustrating an example configuration of a maintenance device that can be used in the pneumatic conveyance system of FIG. 1.
Figure 3:
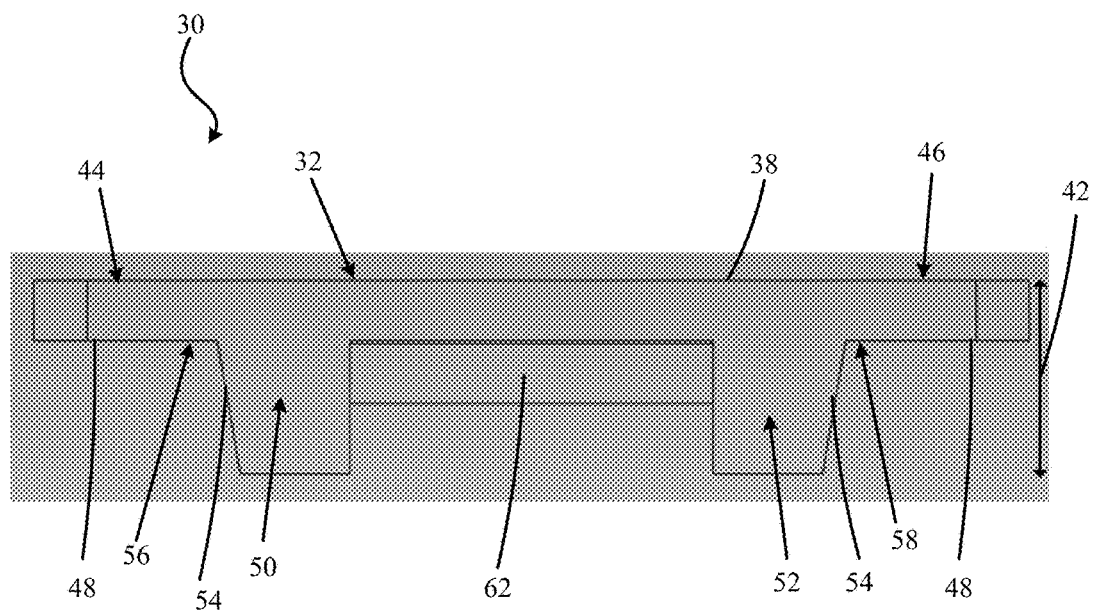
FIG. 3 is an elevational view of an end of the maintenance device of FIG. 2.

FIGS. 2 and 3 show an example maintenance device 30 that can be used to clean the pneumatic conveyance line 12. FIG. 2 shows a perspective view of the device 30, while FIG. 3 shows an elevational view of an end of the device 30. The device 30 includes a body 32 that can be configured to be positioned on the pneumatic conveyance line, such as between the opposing rails of the pneumatic conveyance track. The body 32 defines a centerline 34 extending along a length of the body from a leading end 36 to a trailing end 38 of the body 32. The body 32 also defines a width 40 extending perpendicularly to the length and thus, in the illustrated embodiment, perpendicularly to the centerline 34.

In the example shown in FIGS. 2 and 3, body 32 is elongated in shape and has a length that is greater than the width 40 of the body 32. In other examples, body 32 can be square, curved, or have yet other shapes. In general, body 32 is sized to fit between rails 16 of conveyance line 12. In some examples, body 32 is inserted into an opening at the terminal end of conveyance track 14 and then conveyed along the length of the conveyance line. Additionally or alternatively, body 32 may be configured to be inserted through slot 20 between rails 16, 18 at any point along the length of conveyance track 14. For example, body 32 may have a maximum thickness 42 less than the width of slot 20. When so configured, body 32 may be turned so its thickness 42 is perpendicular with respect to ground, inserted up into conveyance track 14 through slot 20 and then rotated approximately 90 degrees to position the wings 44, 46 on top of rails 16, 18.

Device 30 and body 32 may have a variety of sizes, e.g., depending on the configuration of the conveyance system on which device 30 is to be used. In some examples, the length of the body 32 can range from 1 centimeter to 25 centimeters, such as from 2 centimeters to 15 centimeters, while the width 40 of the body 32 ranges from 1 centimeter to 15 centimeters, such as from 2 centimeters to 10 centimeters. The body 32 further defines a thickness 42. In some examples, the thickness 42 of the body 32 is less than 50 centimeters, such as less than 25 centimeters, or less than 10 centimeters. In configurations where body 32 is comparatively longer, the body may include an articulating joint to allow the body to navigate turns, corners, and junctions.

In the embodiment shown, the body 32 is a single integral piece formed of a polymeric material. However, in other embodiments, the body 32 can be fabricated from distinct components assembled together and/or formed of various other materials suitable for the intended application of the device. In addition, although body 32 can be fabricated from a polymeric material (e.g., in instances where device 30 is intended to be disposable/recyclable), body 32 can be fabricated from metal, ceramic, or other suitable materials. In some examples, body 32 is formed of a corrugated or foldable structure that is assembled onsite from a planar sheet of material (e.g., by an end user) before being inserted into slot 20.

The weight of device 30 can vary depending on the material from which the device 30 is fabricated. In general, device 30 may be configured with enough weight to press against track 14 with sufficient downward force to properly clean/or lubricate the track (e.g., preventing device 30 from floating over or off of the track). However, device 30 may be sufficiently light such that the device does not generate too much frictional resistance against tracks 14 and can move under the motive force provided by conveyance line 12 (e.g., with or without objects 26 positioned to help drive the device). In some examples, device 30 has a weight of at least 20 grams, such as a weight of at least 30 grams, which can be sufficient to keep device 30 on the tracks and provide sufficient contact with the tracks. However, device 30 may have a weight less than 500 grams, such as a weight less than 300 grams, which can prevent the device from generating too much frictional resistance to be moved by pneumatic force generated by the conveyance system. In some examples, device 30 may have a weight within a range from 15 grams to 200 grams, such as from 20 grams to 75 grams.

Such weight ranges may prevent device 30 from lifting off of the tracks during propulsion yet not be so heavy as to generate too much frictional resistance and unduly inhibit conveyance. A cleaning device according to the disclosure may be lighter or heavier, however, according to the amount of pneumatic force provided by the specific system being cleaned.

In some examples, device 30 may include a counterweight as part of the body 32. For instance, a counterweight may be removably or permanently inserted within the body 32. Where the body 32 is formed of a polymeric material, the counterweight can have a density greater than a density of such polymeric material (e.g., a disk of metal). Use of one or more counterweights may help to stabilize the device as it moves along the pneumatic conveyance line, e.g., by adding increased mass to device 30 and/or lowering a center of gravity of the device. In other examples, the weight of the material forming device 30 may be sufficient such that additional counterweighting is not needed.

In the illustrated configuration of FIGS. 2 and 3, the width 40 of the body 32 defines a pair of wings 44, 46 each projecting out from the centerline 34. For example, the wings 44, 46 may project from the centerline 34 in opposite directions and each include a bottom surface 48. In addition, one or more rails may project downwardly from the wings 44, 46 to form a notch between the rail(s) and wings configured (e.g., sized and shaped) to receive rails 16, 18 of the pneumatic conveyance track 14.

FIG. 2 illustrates a first rail 50 projecting downwardly from the wing 44 (e.g., from the bottom surface 48) on the body 32. Further, a second rail 52 projects downwardly from the wing 46 (e.g., from the bottom surface 48) on the body 32. Although the body 32 is shown as including two rails 50, 52, in other embodiments, the body can include any number of rails, such as a single rail (e.g., extending downwardly from the centerline) or three or more rails.

The one or more rails 50, 52 may define sidewall surfaces 54 facing outwardly from the centerline 34 of the body. For example, the wing 44 and rail 50 may together define a groove 56. The groove 56 can have a top surface formed by the bottom surface 48 of the wing 44 and a sidewall surface formed the sidewall surface 54 of the rail 50. Likewise, the wing 46 and rail 52 can together define a groove 58 on the opposite side of the one or more rails. The groove 58 can have a top surface formed by the bottom surface 48 of the wing 46 and a sidewall surface formed the sidewall surface 54 of the rail 52.

In some examples, the cleaning device 30 is configured with a bumper on the leading end and/or trailing end for contacting a leading object and/or trailing object on the pneumatic conveyance line. For example, in the configuration of FIG. 2, the body 32 is illustrated as including rounded grooves 60, 62. In this embodiment, the rounded groove 60 is included at the leading end 36 of the body 32 and the rounded groove 62 is included at the trailing end 38 of the body 32. In some examples, the rounded groove 60 and/or the rounded groove 62 can be formed at an end of a projection that extends out from the portion of body 32 defining wings 46, 46 (e.g., at the respective leading and trailing ends 36, 38). As such, the rounded groove 60 and/or the rounded groove 62 can be configured so as to be a first point of contact with the body 32 at the leading and trailing ends 36, 38. In other examples, the rounded groove 60 and/or the rounded groove 62 can be flush with or recessed relative to the portion of the body 32 defining wings 46, 46.

The one or more bumpers on device 30 that are illustrated as rounded grooves 60, 62 can be circular in shape or have a different cross-sectional shape (e.g., a polygonal or arcuate shape). For example, the bumper on the leading edge and/or trailing edge of device 30 may be shape-indexed to have a shape that corresponds (e.g., generally or exactly matches) the cross-section shape of the object to be conveyed on pneumatic conveyance system 12. Configuring device 30 with a generally rounded-shaped (e.g., circular, oval) groove 60, 62 may be useful for configuring the device to mate with a circular shaped (e.g., circular cross-section) bottle or other object also being conveyed along the pneumatic conveyance line. In this way, when the generally rounded groove 62 at the trailing end 38 mates with a bottle positioned in the pneumatic conveyance track, the bottle can be used to propel the body 32 along the track. As a result, device 30 need not have its own propulsion device but can instead be moved along the track simply by the conveyance of objects, such as bottles, already using the track.

In examples where conveyance objects are positioned behind device 30 (e.g., in contact with trailing end 38) to help drive the device through system 10, the configuration of the objects can vary. For example, the number and size of objects used to help propel device 30 through conveyance line 12 can vary, e.g., depending on the mass of each object and the pressure at which conveyance line 12 operates. In one example, a single object (e.g., bottle) typically conveyed on conveyance line 12 is positioned behind device 30 and used to help propel the device through the system. In other examples, a plurality of such objects are positioned behind device 30 and used to help propel the device through the system. The number of objects may be at least two, such as at least five, or at least ten. For example, the number of object may range from two to ten or more. In one example, such as where object 26 is a plastic bottle or preform, at least five such objects may be positioned behind device 30 to help convey the device through conveyance line 12.

In some examples, the weight of the object(s) 26 positioned behind device 30 to convey the device through the pneumatic conveyance system is equal to or greater than the weight of device 30 itself. For example, the cumulative weight of the object(s) 26 positioned behind device 30 to convey the device through the pneumatic conveyance system may be equal to at least twice the weight of device 30 itself, such as from two times the weight of device 30 to ten times the weight of device 30.

As noted, the device 30 can carry via the body 32 one or more agents useful for maintaining a pneumatic conveyance track. The one or more agents carried by the body 32 can include agents (e.g., fluids, solids) for cleaning (e.g., with or without sanitizing) and/or lubricating the pneumatic conveyance tracks. Example agents that may be carried by device 30 include, but are not limited to: an alcohol-based sanitizer, peroxide sanitizer, peracid sanitizer, quaternary ammonium sanitizer, mixed-peracid sanitizer, acid-based cleaner, silicone-based lubricant, amine-based lubricant, phosphate ester-based lubricant, alkaline-based cleaner, and surfactant-based cleaner. In still other examples, device 30 may be used without carrying any chemical agents, e.g., allowing frictional interaction between the device and conveyance system to clean the system.

Device 30 can carry chemical agents in a variety of different ways. For instance, one or both of the wings 44, 46 can carry the one or more agents. As one example shown in FIG. 2, one or more sheets 64 can be impregnated with the one or more agents and attached to one or both of the wings 44, 46. The sheet 64 can cover the bottom surfaces 48 of each of the wings 44, 46 such that the sheet 64 is configured to contact surfaces upon which the wings 44, 46 are configured to contact. In some examples, sheet 64 also extends at least partially (and, in other examples, fully) down the one or more rails 50, 52. The term "sheet" as used herein includes any structure that can be attached to the cleaning device 30 and optionally contain a cleaning and/or lubricating agent, such as a brush head, a cloth, a sponge, and a scrub pad. Thus, the term sheet does not does not require the use of a structure having a specific shape or profile provided the structure performs the functions attributable to a sheet as described herein.

While any suitable sheeting structure or materials may be used on device 30, in one specific example, a non-woven cloth is attached to device 30 to define a cleaning surface that interacts with the pneumatic conveyance track and optically carries a chemical agent. The non-woven cloth may be fabricated from cotton, cellulosic fibers, polymeric fibers, or other suitable materials. A non-woven cloth material may be useful to help trap debris released from the pneumatic conveyance track during cleaning in the fibers of the cloth.

A single sheet 64 can be used and attached to both wings 44, 46, such as by wrapping around a top and/or bottom surface of the body 32. Alternatively, two or more separate sheets 64 can be used and separately attached to each of the respective wings 44, 46. In such example, the wings 44, 46 carry the one or more agents by carrying the sheet 64. Therefore, although sheet 64 is not illustrated as extending over the top surface of device 30, in practice, the sheet may be positioned over the top surface and wrapping around the underside of the wings of the device. Sheet 64 can be attached using adhesive, clips, snaps, hook and loop fasteners, or other mechanical fixation elements. As another example, as will be described with respect to FIG. 4, sheet 64 can be friction fit to device 30.

As another example, the body 32 can be formed of a porous material, such as at the bottom surfaces 48 of the wings 44 and/or 46, and impregnated with the one or more agents. In this example, the one or more agents can be delivered from the body 32 as the porous body travels along tracks 14 without attaching a separate sheet 64. The body 32 can deliver the one or more agents at the bottom surfaces 48 of the wings 44, 46 such that the one or more agents are delivered to surfaces upon which the wings 44, 46 are configured to contact.

In some examples, body 32 includes an electronically readable tag (e.g., near field communication tag, radio frequency identification tag, optically readable bar code). The electronically readable tag can be embedded within body 32 or affixed to an external surface of the body. In either case, the electronically readable tag may provide unique information identifying each device 30 and may optionally store information concerning the utilization history of each device. Data read from the electronically readable tag can facilitate inventory tracking and compliance with cleaning protocols.

In use, the device 30 can be positioned on the pneumatic conveyance line 12. For example, the body 32 may be positioned between the opposing rails 16, 18 of the pneumatic conveyance track 14. The body 32 can be configured so that, when positioned between the opposing rails of the track, the bottom surface 48 of each of the wings 44, 46 is positioned on a respective one of the opposing rails of the track. At the same time, the body 32 can also be configured so that each of the rails 50, 52 is configured to be positioned between the opposing rails of the track. In this way, each of the grooves 56, 58 is configured such that the top surface of each groove 56, 58 (e.g., formed by the bottom surfaces 48 of the wings 44, 46) is positioned in contact with the upwardly facing surfaces of the respective opposing rails of the track. Further, each of the grooves 56, 58 can be configured such that the sidewall surfaces of each groove 56, 58 (e.g., formed by the sidewall surfaces 54 of the rails 50, 52) is positioned in contact with the sidewall surfaces of the respective opposing rails of the track.

When the device 30 is positioned on the pneumatic conveyance line as described, the device 30 can move along the track to perform various types of maintenance tasks. As noted, some embodiments of the device 30 are configured so as to mate with an object being conveyed along the line. As a result, the object being conveyed along the line acts to provide motive force (e.g., alternative to, or in addition to, the force of the pressurized air acting directly on device 30) for moving the device 30 along the track. As the device 30 moves along the track, it can deliver one or more agents useful, for instance, for cleaning and/or lubricating, and/or sanitizing the track. The configuration of the device 30 as described can allow the one or more agents to be delivered on the upwardly facing surfaces of the opposing rails of the track and/or the sidewall surfaces of the opposing rails of the track. Moreover, the configuration of the rails 50, 52 between the opposing rails of the track can help to stabilize the device 30 as it moves along the track. As one example, this configuration of the rails 50, 52 may help to prevent the device 30 from experiencing excessive rotation (e.g., causing leading end 36 to rotate upward off the track) or lateral movement along the track.

In the embodiment shown in FIG. 2, the device 30 includes a further structure that may act to provide additional stability to the device 30 as it is urged along the track. As shown, the body 32 includes a fin 66 projecting away from a top surface of the body 32. The fin 66 can project away from the top surface of the body 32 at a variety of orientations. In the illustrated embodiment, the fin 66 projects out from the top surface of the body 32 in a direction opposite the rails 50, 52 and at an angle that extends in a direction from the leading end 36 to the trailing end 38. The fin 66 can be configured to contact a top surface of the track (e.g., a surface of the track opposite the opposing rails). The fin 66 can help to keep the wings 44, 46 of the device 30 in contact with the opposing rails of the track by providing a counterforce against the device 30 lifting off of the opposing rails. In other examples, device 30 does not include fin 66.

Figure 4:
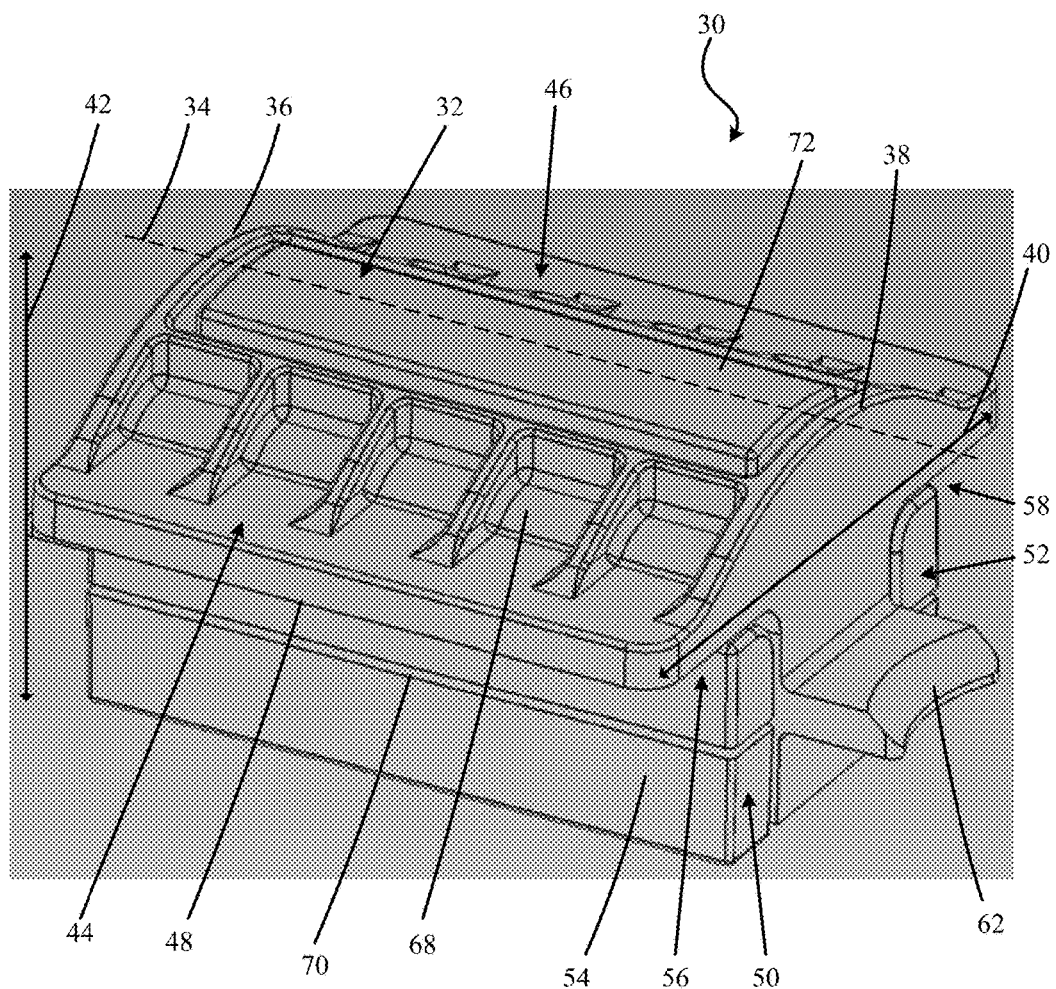
FIG. 4 is a perspective view illustrating another example configuration of a maintenance device.

As discussed above, the device 30 can have a variety of different configurations. FIG. 4 shows a perspective view of another configuration of the device 30. In addition to one or more of those configurations already described, the device 30 as illustrated in FIG. 4 includes a plurality of ribs 68 formed in the body 32. The ribs 68 can be present on each side of the centerline 34 at a location between the centerline 34 at a tip of each wing 44, 46. Configuring device 30 with ribs may be useful if injection molding processes are used to form the device. The inclusion of ribs 68 can help keep the wall thicknesses of device 30 substantially uniform, preventing gas pockets or other surface deformations due to having thicker and thinner body regions.

The device 30 may be formed of two or more separable components, which can join together to form slots 70 defined in the each of the rails 50, 52. For example, device 30 may be formed of two sections that slide relative to each other to removably couple and decouple the sections together. Sheet 64 carrying chemical agent can be positioned over the upper surface of device 30 and wrapped around the underside of wings 44, 46. Thereafter, the second portion of the body may be positioned over the portion of sheet 64 extending past wings 44, 46, mechanically engaging together to trap the sheet therebetween.

The device 30 as illustrated in FIG. 4 further includes a bumper 72. The bumper 72 can extend out from the body in a direction opposite the rails 50, 52 and elevate above the upper surface of the wings 44, 46. In this configuration, the bumper 72 may form an uppermost contact point on the body 32. As such, the bumper 72 can act to contact the top surface of the track (e.g., a surface of the track opposite the opposing rails) as the device 30 moves along the track. In this manner, the bumper 72, similar to the fin previously described, can help to keep the wings 44, 46 of the device 30 in contact with the opposing rails of the track and thereby provide additional stability to the device 30 and increase the operational efficiency of the device 30.

Figure 5:
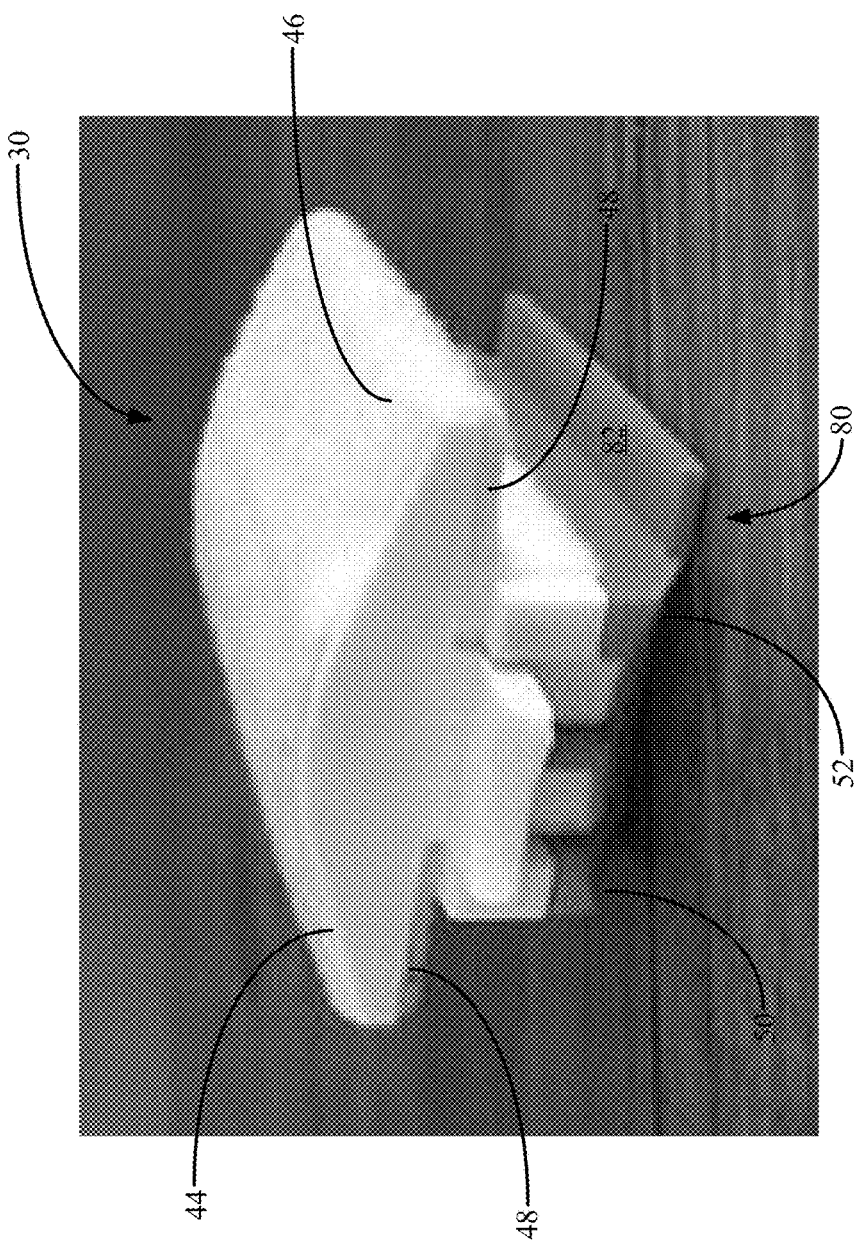
FIG. 5 illustrates another example configuration of a maintenance device.

FIG. 5 illustrates another example configuration of cleaning device 30. Cleaning device 30 in the example of FIG. 5 is configured as discussed above with respect to FIG. 4 but further includes retaining ledges 80 extending outwardly from the opposed sides of the one or more rails 50, 52 (e.g., from a terminal edge of the rails). Each retaining ledge 80 may extend outwardly from a corresponding side of the one or more rails 50, 52 in a direction parallel to or angled relative to a corresponding wing 44, 46. In the example of FIG. 5, the retaining ledges 80 are illustrated as extending parallel to a corresponding wing 44, 46 to form a generally U-shaped channel bounded by a bottom surface 48 of each wing, a sidewall of the one or more rails 50, 52, and a top surface 82 of the retaining ledge. The channel formed by the retaining ledge can be configured to allow a respective one of the rails 16, 18 to fit within the channel. When installed in pneumatic conveyance system 12, the top surface 82 of the retaining ledge may or may not contact the bottom surface of rails 16, 18. In either case, the retaining ledges 80 can help prevent the device 30 from lifting off of the rails 16, 18 during operation, e.g., by providing a physical barrier that contacts the bottom surface of rails 16, 18 if the device attempts to lift off of the rails during operation.

When device 30 is configured with retaining ledges 80, the distance between the top surface 82 of each retaining ledge and bottom surface 48 of each wing may vary depending on the dimensions of the rails to be cleaned. In some examples, the distance ranges from 5 mm to 30 mm, such as from 10 mm to 25 mm.

Sheet 64 carrying chemical agent can be positioned over the upper surface of device 30 and wrapped around the underside of wings 44, 46. Thereafter, the second portion of the body may be positioned over the portion of sheet 64 extending past wings 44, 46, mechanically engaging together to trap the sheet therebetween.

Figure 6:
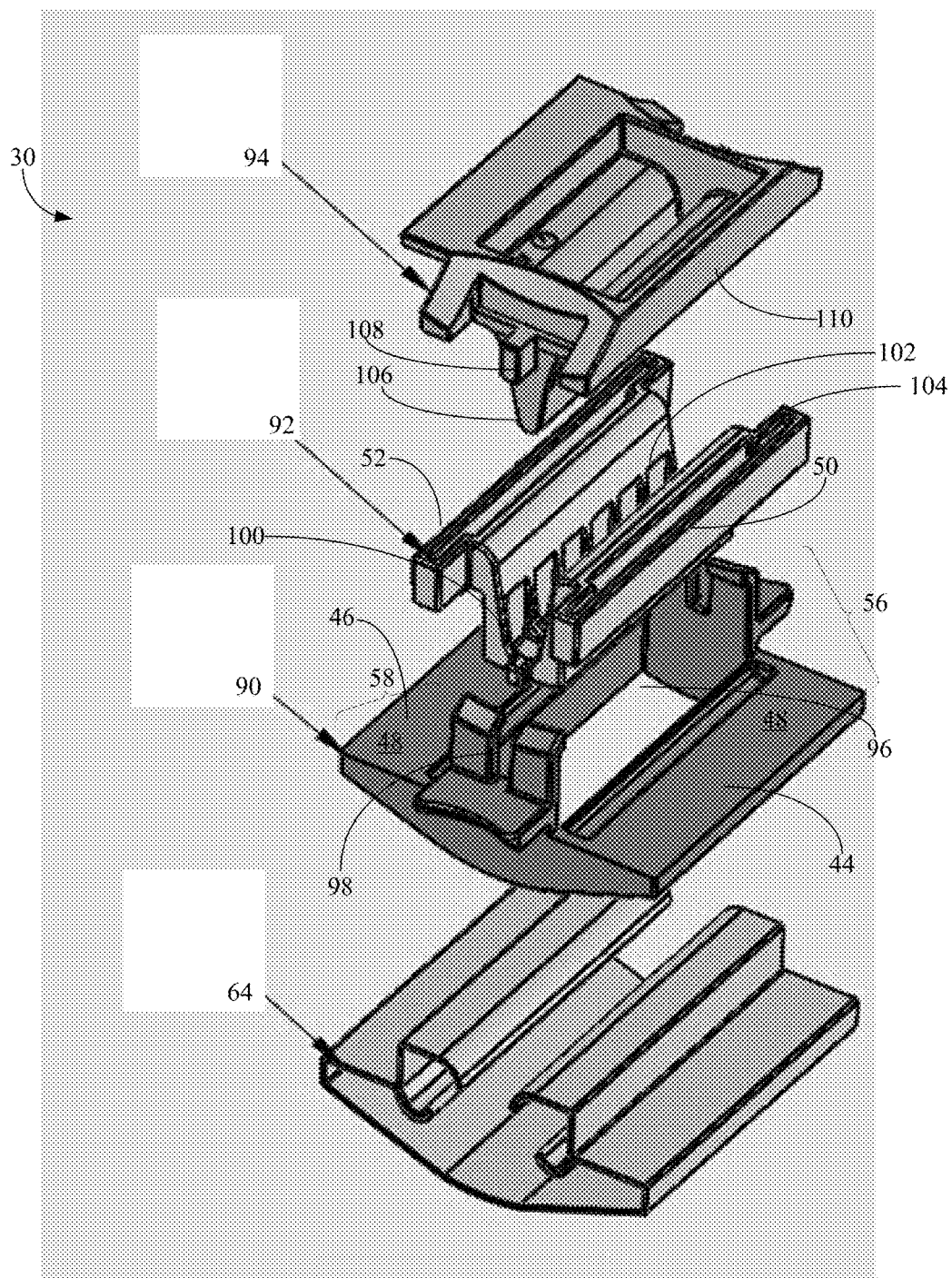
FIG. 6 is an exploded perspective view showing an example configuration of a multiple piece maintenance device.

As noted above, device 30 can have a variety of different configurations, including single piece constructions and multi-piece constructions. FIG. 6 is an exploded perspective view showing an example configuration of a multiple piece configuration of device 30 according to FIG. 5. Device 30 may include at least two, and in the illustrated configuration three, separate pieces that engage with each other to form the device structure and, optionally, retain one or more sheets 64. In the configuration of FIG. 6, device 30 is composed of a wing member 90 that defines wings 44, 46, a rail member 92 that defines one or more rails 50, 52, and a locking member 94. Rail member 92 can engage with wing member 90 to form groove 56 between a bottom surface 48 of wing 44 and a sidewall surface formed by rail 50. Likewise, engaging rail member 92 with wing member 90 can from groove 58 between a bottom surface 48 of wing 46 and a sidewall surface formed by rail 52.

Any suitable mechanical fixation features can be used to engage and secure wing member 90 with rail member 92 and locking member 94 such as adhesive, pins, screws, and clips. In some examples, wing member 90, rail member 92, and locking member 94 are configured to snap fit together with corresponding apertures and engaging tabs such that the components may be held together with frictional interference. In the example of FIG. 6, wing member 90 includes a central receiving opening 96 and a pair of tab locking openings 98 at the leading and trailing end of the body. The central receiving opening 96 is configured (e.g., sized and shaped) to receive a central portion of rail member 92. Additionally, in this example, rail member 92 includes a pair of tabs 100 on opposite ends configured to be inserted into the corresponding pair of tab locking openings 98.

To secure locking member 94 to rail member 92, the rail member 92 is illustrated as having a central receiving opening 102 and a pair of receiving openings 104 running parallel to the length of the rail member. Locking member 94 can include an apex 106 configured to be inserted into the central receiving opening 102 of the rail member 92. Locking member 94 may also include a pair of tabs 108 configured to be inserted into the corresponding pair of tab locking openings 98 of wing member 90 (e.g., in contact with the pair of tabs 100 on rail member 92). Locking member 94 may also include a pair of sidewall projections 110 configured to be inserted into the corresponding receiving openings 104 on rail member 92.

To assemble device 30 in FIG. 6, the sheet 64 may be wrapped around the top surface and wings 44, 46 of wing member 90, extending at least partially into central receiving opening 96. Rail member 92 can then be inserted into central receiving opening 96 with tabs 100 being inserted into tab locking openings 98. This can pinch the sheet 64 in the central receiving opening 96. The sheet can then be wrapped around rails 50, 52 and over receiving openings 104. Thereafter, locking member 94 can be inserted into central receiving opening 102 with sidewall projections 110 being inserted into receiving openings 104. This can pinch sheet 64 in the receiving openings. In some examples, an additional mechanical fixation element, such as a stake or pin is inserted through wing member 90, rail member 92, and locking member 94 to further secure the members together.

Figure 7:
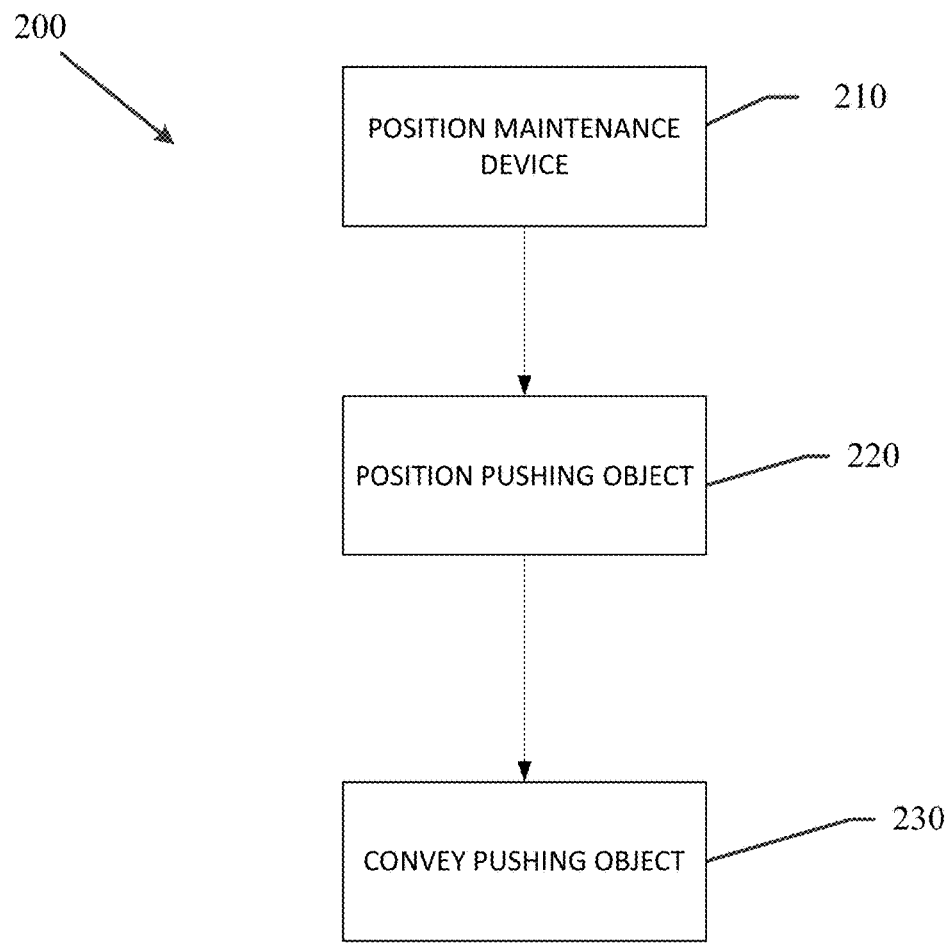
FIG. 7 is a flow diagram illustrating an example method of maintaining a pneumatic conveyance system.

FIG. 7 shows a flow diagram illustrating an example method 200 for maintaining a pneumatic conveyance system. The method 200 includes the step of positioning the maintenance device in the pneumatic conveyance system (210). Positioning the device can include positioning the body of the device between opposed rails of a pneumatic conveyance track. For example, the body can be positioned between opposed rails by positioning each of the wings of the body on a respective one of the opposed rails of the track, such as on an upwardly facing surface of each of the opposed rails. In some cases, the body can be positioned between opposed rails by positioning one or more rails that project downwardly from the wings between the opposed rails of the track. The step of positioning the device can occur regardless of whether the pneumatic conveyance system is operating, and, in some instances, may occur while the pneumatic conveyance system is actively pneumatically conveying objects to be processed along the track. Depending on the configuration of the device, an operator may attach a flexible carrier substrate (e.g., fabric containing chemical agent) to the device before positioning the device in the pneumatic conveyance system.

The method 200 also includes the step of positioning one or more pushing objects on the pneumatic conveyance track (220). The one or more pushing objects (e.g., bottles) can be positioned so as to trail the trailing end of the device. In some cases, two or more pushing objects (e.g., five pushing objects) can be positioned at a location so as to trail the trailing end of the device. Furthermore, in certain instances the device may be sandwiched between opposing objects being conveyed along the track.

In addition, the method 200 includes the step of conveying the one or more positioned pushing objects (230). This can include pneumatically conveying the one or more positioned pushing objects along the track via pressurized air or other fluid. This can result, for example, in the one or more pushing objects coming into contact with the tailing end of the device. Where the tailing end of the device includes the rounded groove, the pushing object can mate to the device at the rounded groove. As the one or more pushing objects come into contact with the device, the one or more pushing objects can be caused to push the device along the track (e.g., along the opposed rails). Consequently, the device may not need to propel itself independently, but instead can rely on the conveyance of the one or more pushing objects, by the pressurized air, to provide the motive force to propel the device along the track. Pushing the device along the track may act to one or more of clean, lubricate, or otherwise service the track.

In some cases, the step of positioning the device can additionally include attaching one or more sheets impregnated with one or more cleaning, lubricating, and/or other agents to the body 32. For example, the one or more sheets can be attached over at least a portion of each of the wings (e.g., the bottom surface of each of the wings) such that the wings carry the one or more agents by carrying the sheet. In other cases, the step of positioning the device can include loading one or more cleaning, lubricating, and/or sanitizing agents into the body of the device. Therefore, when the device is pushed along the track by the one or more pushing objects, the one or more agents can be delivered from the device to the track (e.g., at the opposing rails of the track). Consequently, the pneumatic conveyance system can be maintained in an efficient manner that may reduce labor requirements and increase safety.

In practice, an operator may deploy a cleaning and/or maintenance device 30 according to the disclosure and pass one or more of the devices through a pneumatic conveyance system with any desired frequency. As part of a preventative maintenance program, the operator may run a device 30 through the pneumatic conveyance system at a regular internal, such as once a week, once a day, or once per shift (e.g., 8 hour shift). The regular and periodic preventative maintenance may keep the pneumatic line operating efficiently and reduce or eliminate the need for a more involved manual cleaning.

While maintenance device 30 described herein is generally discussed as being configured for use in a pneumatic conveyance system where pneumatic pressure that conveys objects through the system is used to propel the device, it should be appreciated that other propulsion configurations may be used. As one example, device 30 may include a compressed gas reservoir or other source of motive force that is discharged to propel the device along the track and through the conveyance system being cleaned. As another example, device 30 may include a magnetizable metal and be driven using electromagnetic propulsion forces. As yet a further example, a motor with one or more drive wheels that engage the conveyance track may be incorporated with device 30 to provide a propulsion source for the device.

Various examples have been described. These and other examples are within the scope of the following claims.

The invention claimed is:

1. A device for servicing a pneumatic conveyance line comprising:
    a body having a length extending from a leading end to a trailing end and a width extending perpendicularly to the length, the width of the body defining a pair of wings projecting in opposed directions from a centerline of the body,
    wherein the body is configured to be positioned between opposed rails of a pneumatic conveyance track with each of the pair of wings positioned on a respective one of the opposed rails,
    the pair of wings carry an agent for at least one cleaning and lubricating the opposed rails of the pneumatic conveyance track, and
    the body further comprises at least one rail projecting downwardly from the pair of wings, the at least one rail being configured to be positioned between the opposed rails of the pneumatic conveyance track.

2. The device of claim 1, wherein the trailing end of the body has a shape corresponding to a shape of an object to be conveyed on the pneumatic conveyance track.

3. The device of claim 2, wherein the object is a circular shaped bottle, and the shape of the trailing end of the body is a rounded groove configured to mate with the circular shaped bottle positioned in the pneumatic conveyance track and used to propel the body along the pneumatic conveyance track.

4. The device of claim 1, wherein each of the pair of wings and the at least one rail, in combination, define a groove having a top surface formed by a bottom surface of one of the pair of wings and a sidewall surface formed by the at least one rail, wherein the top surface is configured to be positioned in contact with an upwardly facing surface of a respective one of the opposed rails and the sidewall surface is configured to be positioned in contact with a sidewall of the respective one of the opposed rails.

5. The device of claim 1, wherein the body comprises an elongated body with the length being greater than the width.

6. The device of claim 5, wherein the length ranges from 1 centimeter to 25 centimeters, the width ranges from 1 centimeters to 15 centimeters, and the body has a thickness less than 25 centimeters.

7. The device of claim 1, wherein the device has a total weight greater than 30 grams and less than 300 grams.

8. The device of claim 1, further comprising at least one sheet impregnated with the at least one of a cleaning agent and a lubricating agent, the at least one sheet being attached to the pair of wings such that the pair of wings carry the agent by carrying the sheet.

9. The device of claim 8, wherein the body comprises at least two sections configured to mechanically engage together with the at least one sheet positioned therebetween.

10. The device of claim 8, wherein the at least one sheet covers at least a bottom surface of each of the pair of wings configured to contact a respective one of the opposed rails.

11. The device of claim 1, wherein the body further comprises a pair of retaining ledges extending outwardly from the at least one rail parallel to the pair of wings, wherein a bottom surface of each of the pair of wings, a sidewall of the at least one rail, and a top surface of a corresponding one of each of the pair of retaining ledges collectively define a channel configured to be positioned over each of the opposed rails.

12. A device for servicing a pneumatic conveyance line comprising:

a body having a length extending from a leading end to a trailing end and a width extending perpendicularly to the length, the width of the body defining a pair of wings projecting in opposed directions from a centerline of the body, and at least one sheet impregnated with the at least one of a cleaning agent and a lubricating agent, the at least one sheet being attached to the pair of wings such that the pair of wings carry the sheet, wherein the body is configured to be positioned between opposed rails of a pneumatic conveyance track with each of the pair of wings positioned on a respective one of the opposed rails, and the body comprises at least two sections configured to mechanically engage together with the at least one sheet positioned therebetween, thereby attaching the sheet to the pair of wings.

13. The device of claim 12, wherein the trailing end of the body has a shape corresponding to a shape of an object to be conveyed on the pneumatic conveyance track.

14. The device of claim 12, wherein each of the pair of wings and the at least one rail, in combination, define a groove having a top surface formed by a bottom surface of one of the pair of wings and a sidewall surface formed by the at least one rail, wherein the top surface is configured to be positioned in contact with an upwardly facing surface of a respective one of the opposed rails and the sidewall surface is configured to be positioned in contact with a sidewall of the respective one of the opposed rails.

15. The device of claim 12, wherein the body comprises an elongated body with the length being greater than the width.

16. The device of claim 15, wherein the length ranges from 1 centimeter to 25 centimeters, the width ranges from 1 centimeters to 15 centimeters, and the body has a thickness less than 25 centimeters.

17. The device of claim 12, wherein the device has a total weight greater than 30 grams and less than 300 grams.

18. The device of claim 12, wherein the at least one sheet covers at least a bottom surface of each of the pair of wings configured to contact a respective one of the opposed rails.

19. The device of claim 12, wherein the body further comprises at least one rail projecting downwardly from the pair of wings and a pair of retaining ledges extending outwardly from the at least one rail parallel to the pair of wings, wherein a bottom surface of each of the pair of wings, a sidewall of the at least one rail, and a top surface of a corresponding one of each of the pair of retaining ledges collectively define a channel configured to be positioned over each of the opposed rails.

20. The device of claim 13, wherein the object is a circular shaped bottle, and the shape of the trailing end of the body is a rounded groove configured to mate with the circular shaped bottle positioned in the pneumatic conveyance track and used to propel the body along the pneumatic conveyance track.

* * * * *